United States Patent [19]

Sasajima et al.

[11] Patent Number: 5,241,457
[45] Date of Patent: Aug. 31, 1993

[54] REAR WINDOW STOP LAMP FOR MOTOR VEHICLES

[75] Inventors: Tetsuo Sasajima; Masaru Morikawa, both of Osaka, Japan

[73] Assignee: Nippon Sheet Glass Co., Ltd., Japan

[21] Appl. No.: 923,006

[22] Filed: Jul. 30, 1992

Related U.S. Application Data

[63] Continuation of Ser. No. 822,623, Jan. 17, 1992, abandoned.

[30] Foreign Application Priority Data

Jan. 18, 1991 [JP] Japan .................. 3-5119[U]
May 15, 1991 [JP] Japan .................. 3-43731[U]

[51] Int. Cl.⁵ .............................................. B60Q 1/44
[52] U.S. Cl. .................. 362/80.1; 362/240; 362/800
[58] Field of Search ............ 362/80.1, 800, 237, 362/240, 241, 244

[56] References Cited

U.S. PATENT DOCUMENTS

| | | | |
|---|---|---|---|
| 4,733,335 | 3/1988 | Serizawa et al. | 362/800 |
| 4,935,665 | 6/1990 | Murata . | |
| 4,951,179 | 8/1990 | Machida | 362/800 X |
| 5,050,051 | 9/1991 | Machida et al. | 362/80.1 |
| 5,093,768 | 3/1992 | Ohe | 362/800 |

FOREIGN PATENT DOCUMENTS

| | | |
|---|---|---|
| 326668A3 | 8/1989 | European Pat. Off. . |
| 354468A2 | 2/1990 | European Pat. Off. . |
| 2531386 | 2/1984 | France . |
| 61-129631 | 8/1986 | Japan . |
| 2139340 | 11/1984 | United Kingdom . |

Primary Examiner—Richard R. Cole
Attorney, Agent, or Firm—Merchant, Gould, Smith, Edell, Welter & Schmidt

[57] ABSTRACT

A rear window stop lamp for a motor vehicle, which is energizable when the brake of the motor vehicle is applied, has a resin-molded body attached to the interior side of a rear window glass sheet. The resin-molded body has at least one cavity having a curved reflecting surface. An LED chip is disposed in the cavity substantially at a focal point of the curved reflecting surface. A transparent resin-molded body surrounds the LED chip. A light distribution lens plate covers an opening of the cavity for directing rearwardly a light beam emitted from the LED chip and reflected by the curved reflecting surface. The light distribution lens plate comprises a Fresnel lens. A printed electric wire board is embedded in the resin-molded body for energizing LED units. The printed electric wire board is made of a material having a coefficient of thermal expansion which is closer to that of the rear window glass sheet than to that of the resin-molded body. A thermal expansion inhibiting plate, also embedded in the resin-molded body, is made of a material having a coefficient of thermal expansion which is closer to that of the rear window glass sheet than to that of the resin-molded body.

7 Claims, 2 Drawing Sheets

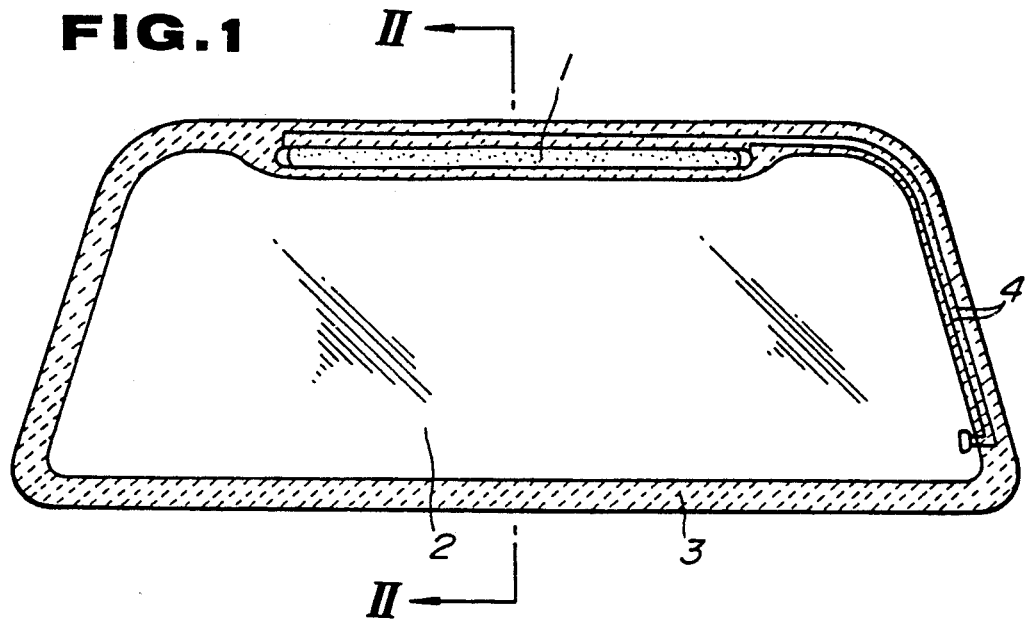
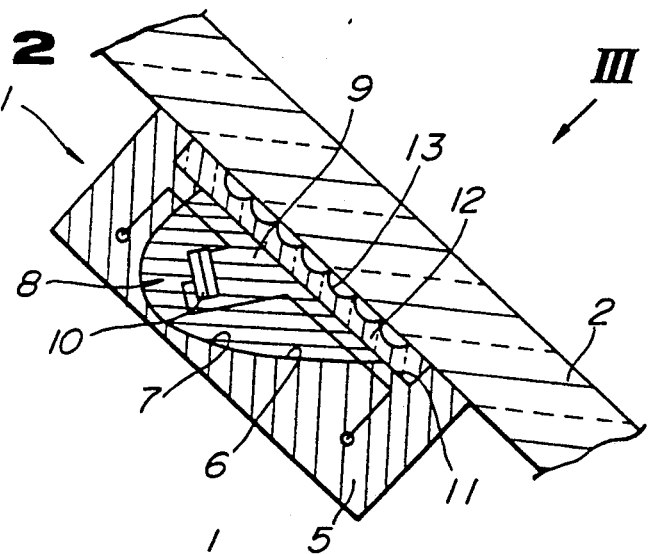
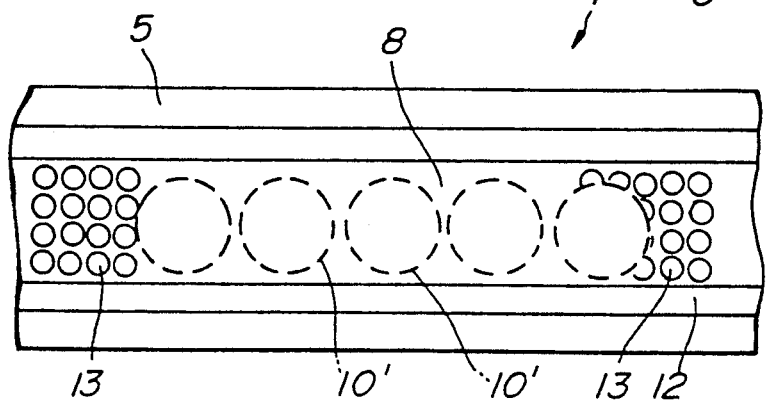

REAR WINDOW STOP LAMP FOR MOTOR VEHICLES

This is a continuation, of application Ser. No. 07/822,623, filed Jan. 17, 1992 now abandoned.

BACKGROUND OF THE INVENTION

1. Field of the Invention

The present invention relates to a rear window stop lamp which may selectively be mounted on the rear window of a motor vehicle and which, when mounted on the rear window, can be energized in response to the application of the brake of the motor vehicle.

2. Description of the Relevant Art

There have recently proposed motor vehicles having a stop lamp mounted as an optional lamp on the upper edge of a rear window in addition to ordinary rear stop lamps which can be energized when the brake of the motor vehicle is applied. One such a rear window stop lamp is disclosed in Japanese Laid-Open Utility Model Publication No. 61-129631, for example. The disclosed rear window stop lamp comprises a plurality of bullet-shaped LEDs housed in a case and directed rearwardly. Light beams emitted by the LEDs are converted by a lens plate into parallel light beams that are directed rearwardly.

Since the light beams emitted by the LEDs of the disclosed rear window stop lamp are directed rearwardly as parallel light beams, it is necessary that the lens plate be disposed in a position which is spaced from the LEDs by a distance equal to the focal length of the lens plate. Therefore, the width of the stop lamp in the longitudinal direction of the motor vehicle is relatively large. As a result, the space between the rear seat of the motor vehicle and the rear window stop lamp is relatively small, and the appearance of the rear window as viewed from within the passenger's compartment of the motor vehicle is unsightly. Another problem is that the rear window stop lamp may easily be reached and tampered with by children who sit on the rear seat.

Generally, the covers or cases of rear window stop lamps are made of a synthetic resin such as polycarbonate resin. When sunlight is directly applied to the rear window stop lamp covers, they tend to be thermally expanded at a rate different from the rate of thermal expansion of the glass of the rear window, resulting in undue shearing stresses developed in the junction between the cover and the window glass.

The polycarbonate resin is relatively hard and cannot easily be bent over. If a cover or case of polycarbonate resin is shaped to a sheet of rear window glass of a particular design, then it cannot be used with a sheet of rear window glass of other designs or shapes. Accordingly, the conventional rear window stop lamp cases or covers of polycarbonate resin are comparatively expensive.

The present invention has been made in an effort to solve the above problems of the conventional rear window stop lamps for use on motor vehicles.

SUMMARY OF THE INVENTION

It is an object of the present invention to provide a rear window stop lamp for motor vehicles which is relatively small width in the longitudinal direction of the motor vehicles.

Another object of the present invention is to provide a rear window stop lamp for motor vehicles which does not apply undue shearing stresses to the junction between the stop lamp and a sheet of rear window glass even when sunlight is directly applied to the sheet of rear window glass.

Still another object of the present invention is to provide a rear window stop lamp that can can be attached to any of of a plurality of sheets of rear window glass of various designs or shapes.

To achieve the above objects, there is provided a rear window stop lamp for a motor vehicle, which is energizable when a brake of the motor vehicle is applied, comprising a resin-molded body adapted to be attached to an interior side of a rear window glass sheet of the motor vehicle, the resin-molded by body having at least one cavity defined therein and having a curved reflecting surface, an LED chip disposed in the cavity and positioned substantially at a focal point of the curved reflecting surface, a transparent resin-molded body surrounding the LED chip, and a light distribution lens plate covering an opening of the cavity for directing rearwardly a light beam emitted from the LED chip and reflected by the curved reflecting surface.

The rear window stop lamp is directly mounted on the interior side of the rear window glass sheet, the resin-molded body having a plurality of cavities defined therein and having respective curved reflecting surfaces. The rear window stop lamp further includes a plurality of LED chips disposed in the cavities, respectively, and positioned substantially at respective focal points of the curved reflecting surfaces, and a plurality of transparent resin-molded bodies surrounding the LED chips, respectively, the cavities, the curved reflecting surfaces, the transparent resin-molded bodies, and the LED chips jointly constituting respective LED units.

The rear window stop lamp further includes a printed electric wire board embedded in the resin-molded body for energizing the LED units, the printed electric wire board being made of a material having a coefficient of thermal expansion which is closer to that of the rear window glass sheet than to that of the resin-molded body.

The printed electric wire board comprises a plurality of segments.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a front elevational view of a stop lamp according to a first embodiment of the present invention, as installed on a sheet of rear window glass for a motor vehicle;

FIG. 2 is a cross-sectional view taken along line II—II of FIG. 1;

FIG. 3 is a fragmentary view as viewed in the direction indicated by the arrow III in FIG. 2;

DETAILED DESCRIPTION OF THE PREFERRED EMBODIMENTS

Figure 4:
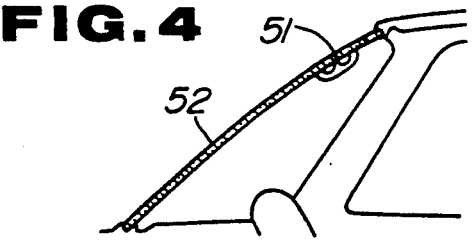
FIG. 4 is a side elevational view, partly in cross section, of a stop lamp according to a second embodiment of the present invention, as installed on a sheet of rear window glass for a motor vehicle.
Figure 7:
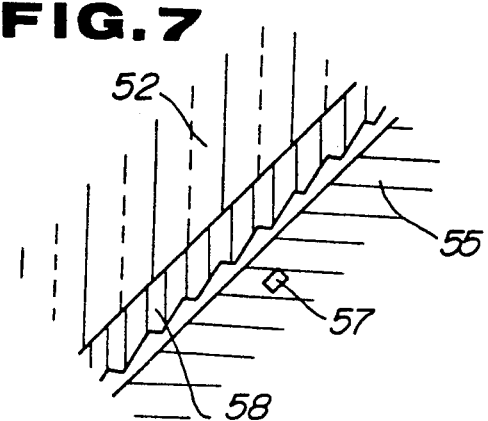
FIG. 7 is an enlarged fragmentary view of a portion of the stop lamp shown in FIG. 5.

A stop lamp according to a first embodiment of the present invention, as installed on a sheet of rear window glass for a motor vehicle, will be described below with reference to FIGS. 1 through 3. FIG. 1 shows the stop lamp, generally denoted at 1, as viewed from within the passenger's compartment of the motor vehicle.

As shown in FIG. 1, the stop lamp 1 is disposed on an upper edge of a sheet of rear window glass 2 of the motor vehicle. The rear window glass sheet 2 has a ceramic collar 3 on marginal edges thereof, and electric wires 4 for supplying an electric current to the stop lamp 1 are printed on some of the marginal edges of the rear window glass sheet 2.

As shown in FIGS. 2 and 3, the stop lamp 1 has a body or case 5 molded of urethane or silicone resin and bonded to the interior side of the rear window glass sheet 2. The resin-molded body 5 is in the form of a thin plate having a thickness in the range of from 5 to 7 mm and a width of about 15 mm. The resin-molded body 5 has a horizontal array of cavities 6 defined therein which open toward the rear window glass sheet 2. The concave inner surface of each of the cavities 6 is of a parabolic cross section, and serves as a reflecting surface 7.

The cavities 6 house reflective LED (light-emitting diode) units 8, respectively. Each of the LED units 8 has an LED chip 10 embedded in a transparent body 9 molded of epoxy resin or the like. The LED chip 10 is electrically connected to the printed electric wires 4 by lead wires (not shown). The LED chip 10 is positioned at the focal point of the reflecting surface 7.

The resin-molded body 5 has a recess defined in the surface thereof facing the rear window glass sheet 2, the recess having a stepped surface 11 around the opening of each of the cavities 6. A light distribution lens plate 12 formed of a synthetic resin such as polycarbonate resin is bonded to the stepped surface 11. The light distribution lens plate 12 has a multiplicity of concave lenses 13 which lie substantially flush with the surface of the resin-molded body 5 that is bonded to the rear window glass sheet 2.

When each of the LED chips 10 of the LED units 8 is energized through the printed electric wires 4 at the time the brake of the motor vehicle is applied, the LED chip 10 emits a light beam forwardly (to the left in FIG. 2) with respect to the motor vehicle. The emitted light beam is then reflected by the reflecting surface 7 to travel as a parallel light beam rearwardly. The parallel light beam is then bent into a horizontal direction by the surface of the light distribution lens plate 12 that is attached to the resin-molded body 5. The parallel light beam thus directed horizontally enters the light distribution lens plate 12, passes through the light distribution lens plate 12, and leaves the light distribution lens plate 12 rearwardly at a predetermined angle. When the stop lamp 1 is viewed from behind the motor vehicle as shown in FIG. 3, a virtual image 10' of each of the LED chips 10 is seen as enlarged.

The stop lamp 1 may be manufactured as follows: First, the LED units 8 with the LED chips 10 embedded in the respective transparent resin-molded bodies 9 are fabricated. Then, a reflecting film of metal is sputtered or otherwise deposited on only the curved surface of each of the respective transparent resin-molded bodies 9. Thereafter, the LED units 8 and the light distribution lens plate 12 are set in a mold, and a synthetic resin is poured into the mold to mold the resin-molded body 5 around the LED units 8 and the light distribution lens plate 12.

Any of various other suitable methods may be employed to manufacture the stop lamp 1. For example, the concave surfaces of the resin-molded body 5 may be coated with a film of metal, providing the reflecting surfaces 7. Alternatively, the resin-molded body 5 may not directly be bonded to the rear window glass sheet 2, but may be attached to the rear window glass sheet 2 through the light distribution lens plate 12 or the like.

With this embodiment, as described above, the resin-molded body 5 in the form of a thin plate attached to the interior side of the rear window glass sheet 2 has cavities 6 with curved reflecting surfaces 7, and the LED chips 10 embedded in the resin-molded bodies 9 are positioned in the respective cavities 6 at the respective focal points of the reflecting surfaces 7, with the open ends of the cavities 6 being covered with the light distribution lens plate 12. Therefore, the resin-molded body 5, the LED units 8, and the light distribution lens plate 12 are assembled in a unitary structure, the entire dimensions of the stop lamp 1 are considerably small. since the stop lamp 1 is directly bonded to the rear window glass sheet 1 rather than being suspended from a hanger, the stop lamp 1 does not present an obstacle to passengers as they get on or off the motor vehicle, and will not be tampered with by children on the rear seat of the motor vehicle. The stop lamp 1 which is integrally combined with the rear window glass sheet 2 is of a sightly appearance.

The stop lamp 1 according to the present invention is adaptable to various rear window glass sheets 2 that are inclined at different angles for use on different motor vehicle designs, simply by changing the configuration of the parabolic reflecting surfaces 7 and without varying the thickness of the stop lamp 1. Therefore, the stop lamp 1 can be offered for use at a relatively low cost.

Consequently, the stop lamp 1 has a relatively small width or dimension in the longitudinal direction of the motor vehicle, and can be used with different rear window glass shapes for different motor vehicle designs.

FIGS. 4 through 7 a stop lamp according to a second embodiment of the present invention, as installed on a sheet of rear window glass for a motor vehicle.

Figure 5:
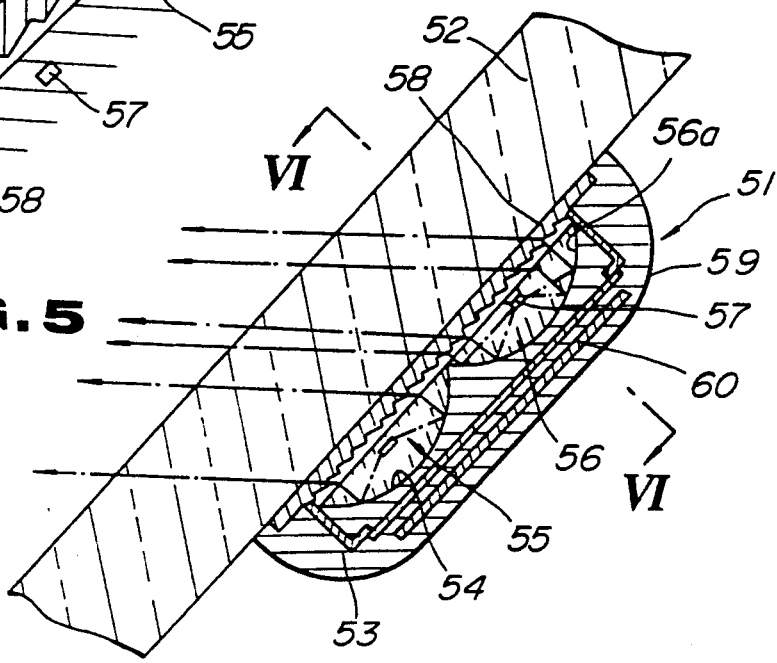
FIG. 5 is an enlarged fragmentary cross-sectional view of the stop lamp shown in FIG. 4.

As shown in FIGS. 4 and 5, the stop lamp, generally denoted at 51, is fixed, by screws or adhesive bonding, to the interior side of an inclined rear window glass sheet 52 at its upper edge. The stop lamp 51 is in the form of a thin plate and has a thickness of about 5 mm (in the transverse direction of the rear window glass sheet 52) and a vertical width of 20 mm or less.

As shown in FIG. 5, the stop lamp 1 comprises a body or case 53 molded of a soft synthetic resin such as silicone resin, PVC, urethane resin, or ethylene propylene rubber, or the like. The resin-molded body 53 has two horizontal arrays of partly spherical cavities 54. Each of the cavities 54 houses a reflective LED unit 55 therein.

The reflective LED unit 55 has a partly spherical transparent body 56 molded of epoxy resin or the like. The resin-molded body 56 has a curved back surface with a mirror finish coated with an aluminum layer by evaporation, serving as a parabolic reflecting surface 56a. The reflective LED unit 55 has an LED chip 57 disposed substantially at the focal point of the reflecting surface 56a. The LED chip 57 emits a light beam which is reflected by the reflecting surface 56a to travel as a parallel light beam from a flat light emission surface of the LED unit 55 that faces the rear window glass sheet 52.

The stop lamp 51 has a linear Fresnel lens 58 held against and bonded to the inner surface of the rear window glass sheet 52 which confronts the flat light emission surfaces of the LED units 55. The light beams that are applied as parallel light beams from the LED units 55 in a direction perpendicular to the rear window glass sheet 52 are directed horizontally by the Fresnel lens 58 so as to pass through and out of the rear window glass sheet 52 in the rearward direction of the motor vehicle.

A printed electric wire board 59 and a thermal expansion inhibiting plate 60 are embedded in the resin-molded body 53 immediately behind the LED units 55 and near the interior side of the resin-molded body 53. The printed electric wire board 59 and the thermal expansion inhibiting plate 60 are fastened together to the resin-molded body 53 by screws 61 (one shown in FIG. 6). The printed electric wire board 59 is electrically connected to a fixed terminal 62 attached to the inner surface of the rear window glass sheet 52.

The printed electric wire board 59 is made of a material such as epoxy resin containing glass fibers which has a coefficient of thermal expansion that is substantially the same as that of the rear window glass sheet 52. The thermal expansion inhibiting plate 60 is made of a material such as stainless steel, titanium, tungsten, or the like which has a coefficient of thermal expansion that is substantially the same as that of the rear window glass sheet 52.

Figure 6:
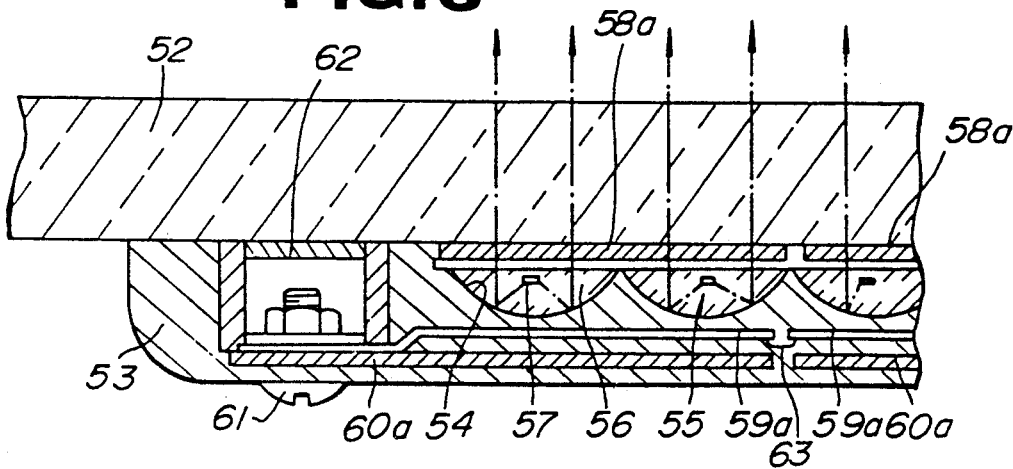
FIG. 6 is a cross-sectional view taken along line VI—VI of FIG. 5.

As shown in FIG. 6, the Fresnel lens 58, the printed electric wire board 59, and the thermal expansion inhibiting plate 60 comprise a plurality of segments 58a, a plurality of segments 59a, and a plurality of segments 60a, respectively. These segments 58a, 59a, 60a are arrayed in the transverse direction of the motor vehicle. The segments 59a of the printed electric wire board 59 are electrically connected to each other by connector wires 63.

Since the Fresnel lens 58, the printed electric wire board 59, and the thermal expansion inhibiting plate 60 comprise transverse arrays of segments 58a, 59a, 60a, the stop lamp 51 is flexible as a whole. The stop lamp 51 can be attached to rear window glass sheets that are bent to large curvatures, without creating gaps or clearances between the stop lamp 5 and the surface of the rear window glass sheets. Therefore, the stop lamp 51 is adaptable to various rear window glass sheets of different shapes.

The stop lamp 51 may be attached to rear window glass sheets 52 that are inclined at different angles simply by replacing the Fresnel lens 58 only. Consequently, the stop lamp 51 is relatively inexpensive.

The stop lamp 51 according to the second embodiment offers the same advantages as those of the stop lamp 1 according to the first embodiment of the present invention. In addition, the stop lamp 51 lends itself to differently curved rear window glass sheets because the Fresnel lens 58, the printed electric wire board 59, and the thermal expansion inhibiting plate 60 comprise transverse arrays of segments 58a, 59a, 60a that make the stop lamp 51 flexible.

The coefficients of thermal expansion of the printed electric wire board 59 and the thermal expansion inhibiting plate 60 that are embedded in the resin-molded body 53 are closer to that of the rear window glass sheet 52 than to that of the resin-molded body 53. Accordingly, even when sun light is directly applied to the rear window glass sheet 52 and the stop lamp 51, any differential thermal expansion of the resin-molded body 53 is minimized. As a result, the junction between the stop lamp 51 and the rear window glass sheet 52 is prevented from developing undue shearing stresses.

The Fresnel lens 58 of the stop lamp 51 is bonded to the rear window glass sheet 52, as described above. However, the Fresnel lens 58 may be directly bonded to the surfaces of the LED units 55 where the emitted light beams leave.

In the illustrated stop lamp 51, nothing is placed in the gap between the Fresnel lens 58 and the LED units 55. However, this gap may be filled with a synthetic resin. If the gap is filled with a synthetic resin, then the material of the Fresnel lens should be selected taking into account the refractive index of the filled synthetic resin.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. A rear window stop lamp for a motor vehicle, which is energizable when a brake of the motor vehicle is applied, comprising:
    a resin-molded body adapted to be directly mounted on an interior side of a rear window glass sheet of the motor vehicle, said resin-molded body having a plurality of cavities defined therein and having respective curved reflecting surfaces;
    a plurality of LED chips disposed in said cavities, respectively, and positioned substantially at respective focal points of said curved reflecting surfaces;
    a plurality of transparent resin-molded bodies surrounding said LED chips, respectively;
    said cavities, said curved reflecting surfaces, said transparent resin-molded bodies, and said LED chips jointly constituting respective LED units;
    a light distribution lens plate covering openings of said cavities for directing rearwardly light beams emitted from said LED chips and reflected by said curved reflecting surfaces; and
    a printed electric wire board embedded in said resin-molded body for energizing said LED units, said printed electric wire board being made of a material having a coefficient of thermal expansion which is closer to that of the rear window glass sheet than to that of the resin-molded body.

2. A rear window stop lamp according to claim 1, wherein said light distribution lens plate comprises a Fresnel lens for directing rearwardly light beams emitted from said LED units.

3. A rear window stop lamp according to claim 2, wherein said Fresnel lens comprises a plurality of segments.

4. A rear window stop lamp according to claim 1, wherein said printed electric wire board comprises a plurality of segments.

5. A rear window stop lamp for a motor vehicle, which is energizable when a brake of the motor vehicle is applied, comprising:

a resin-molded body adapted to be directly mounted on an interior side of a rear window glass sheet of the motor vehicle, said resin-molded body having a plurality of cavities defined therein and having respective curved reflecting surfaces;

a plurality of LED chips disposed in said cavities, respectively, and positioned substantially at respective focal points of said curved reflecting surfaces;

a plurality of transparent resin-molded bodies surrounding said LED chips, respectively;

said cavities, said curved reflecting surfaces, said transparent resin-molded bodies, and said LED chips jointly constituting respective LED units;

a light distribution lens plate covering openings of said cavities for directing rearwardly light beams emitted from said LED chips and reflected by said curved reflecting surfaces; and a printed electric wire board embedded in said resin-molded body for energizing said LED units, and a thermal expansion inhibiting plate embedded in said resin-molded body, said thermal expansion inhibiting plate being made of a material having a coefficient of thermal expansion which is closer to that of the rear window glass sheet than to that of the resin-molded body.

6. A rear window stop lamp according to claim 5, wherein said thermal expansion inhibiting plate comprises a plurality of segments.

7. A rear window stop lamp according to claim 5, wherein said printed electric wire board comprises a plurality of segments, and said thermal expansion inhibiting plate comprises a plurality of segments.

* * * * *